United States Patent
Zhang et al.

(10) Patent No.: US 10,719,256 B1
(45) Date of Patent: Jul. 21, 2020

(54) PERFORMANCE OF DEDUPLICATION STORAGE SYSTEMS

(71) Applicant: Veritas Technologies LLC, Mountain View, CA (US)

(72) Inventors: Lei Zhang, Beijing (CN); Peng Zhang, Beijing (CN); Tao Liu, Beijing (CN); Cheng Wan, Beijing (CN); Cheng Hai Zhu, Beijing (CN); Guang Yang, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 257 days.

(21) Appl. No.: 15/395,137

(22) Filed: Dec. 30, 2016

(51) Int. Cl.
G06F 3/06 (2006.01)

(52) U.S. Cl.
CPC ............ *G06F 3/065* (2013.01); *G06F 3/067* (2013.01); *G06F 3/0608* (2013.01); *G06F 3/0619* (2013.01); *G06F 3/0641* (2013.01)

(58) Field of Classification Search
CPC .. G06F 11/1448; G06F 11/1453; G06F 3/065; G06F 3/0619; G06F 3/0641; G06F 3/067; G06F 3/0608
USPC ........................................................ 711/162
See application file for complete search history.

(56) References Cited

U.S. PATENT DOCUMENTS

| | | | | |
|---|---|---|---|---|
| 7,478,113 B1* | 1/2009 | De Spiegeleer | .... | G06F 11/1453 |
| 7,685,171 B1* | 3/2010 | Beaverson | .......... | G06F 11/1451 707/999.202 |
| 8,904,125 B1* | 12/2014 | Elling | ................. | G06F 11/1451 711/162 |
| 8,983,952 B1* | 3/2015 | Zhang | ................. | G06F 11/1453 707/736 |
| 9,501,365 B2* | 11/2016 | Parab | .................. | G06F 11/1453 |
| 2011/0161291 A1* | 6/2011 | Taleck | ............. | G06F 17/30156 707/622 |
| 2011/0161297 A1* | 6/2011 | Parab | ............... | G06F 17/30156 707/646 |
| 2012/0084261 A1* | 4/2012 | Parab | .................. | G06F 11/1453 707/654 |
| 2012/0233345 A1* | 9/2012 | Hannuksela | ..... | H04N 21/26258 709/231 |

OTHER PUBLICATIONS

Upadhyay, A. et al, "Deduplication and Compression Techniques in Cloud Design", IEEE International Systems Conference SysCon 2012 (pp. 1-6).*

* cited by examiner

*Primary Examiner* — Pierre Miche Bataille
(74) *Attorney, Agent, or Firm* — Campbell Stephenson LLP

(57) ABSTRACT

Disclosed herein are methods, systems, and processes to improve backup and restore performance in deduplication storage environments. A metadata stream that includes data segment offsets that are associated with data segments of a previous backup image and indicate data segment boundaries is received. An offset for an include operation is determined. The include operation references one or more data segments, and is part of a request to perform a backup operation. The backup operation is performed by modifying the include operation, if the offset involves one or more partial data segments.

17 Claims, 14 Drawing Sheets

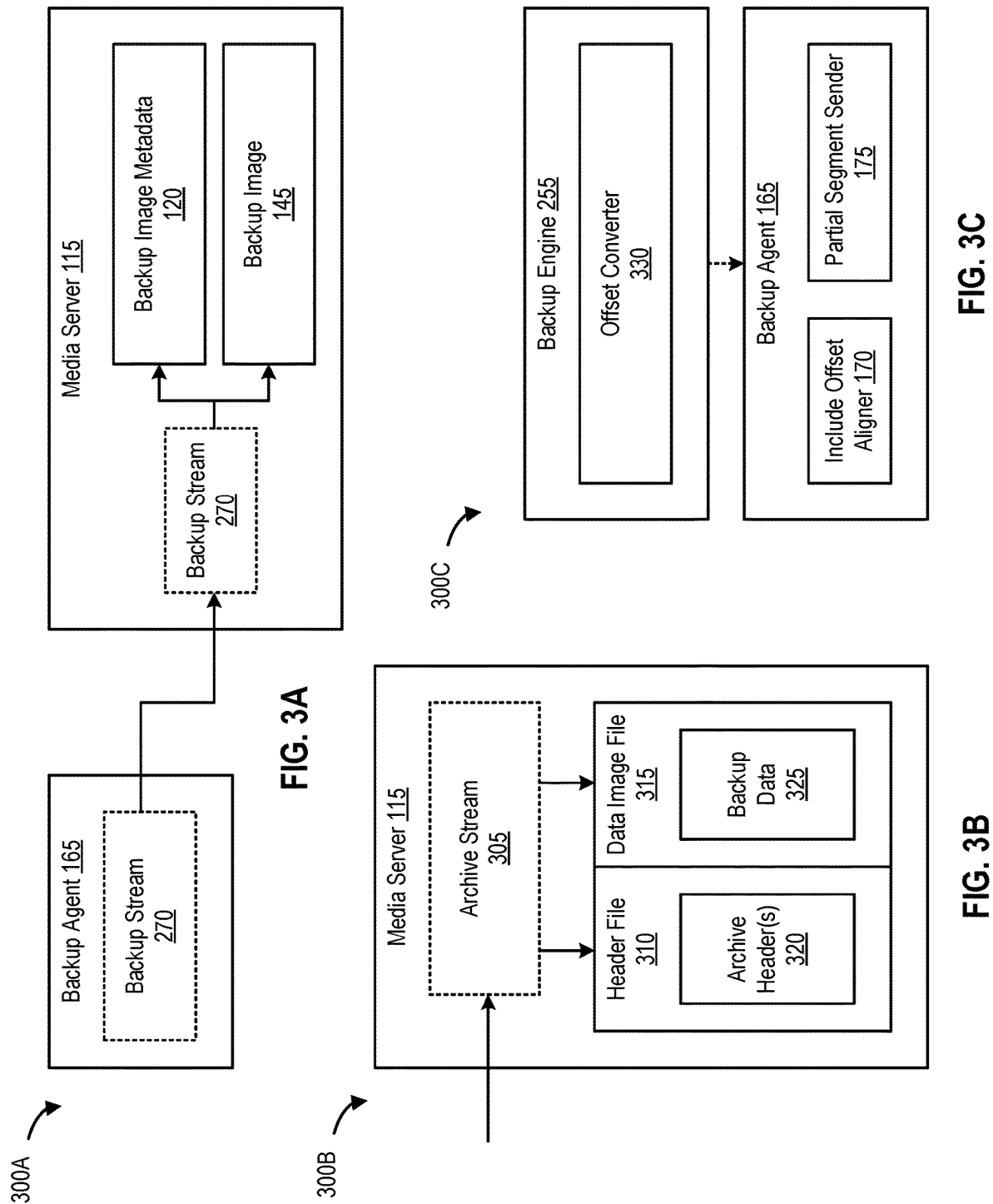

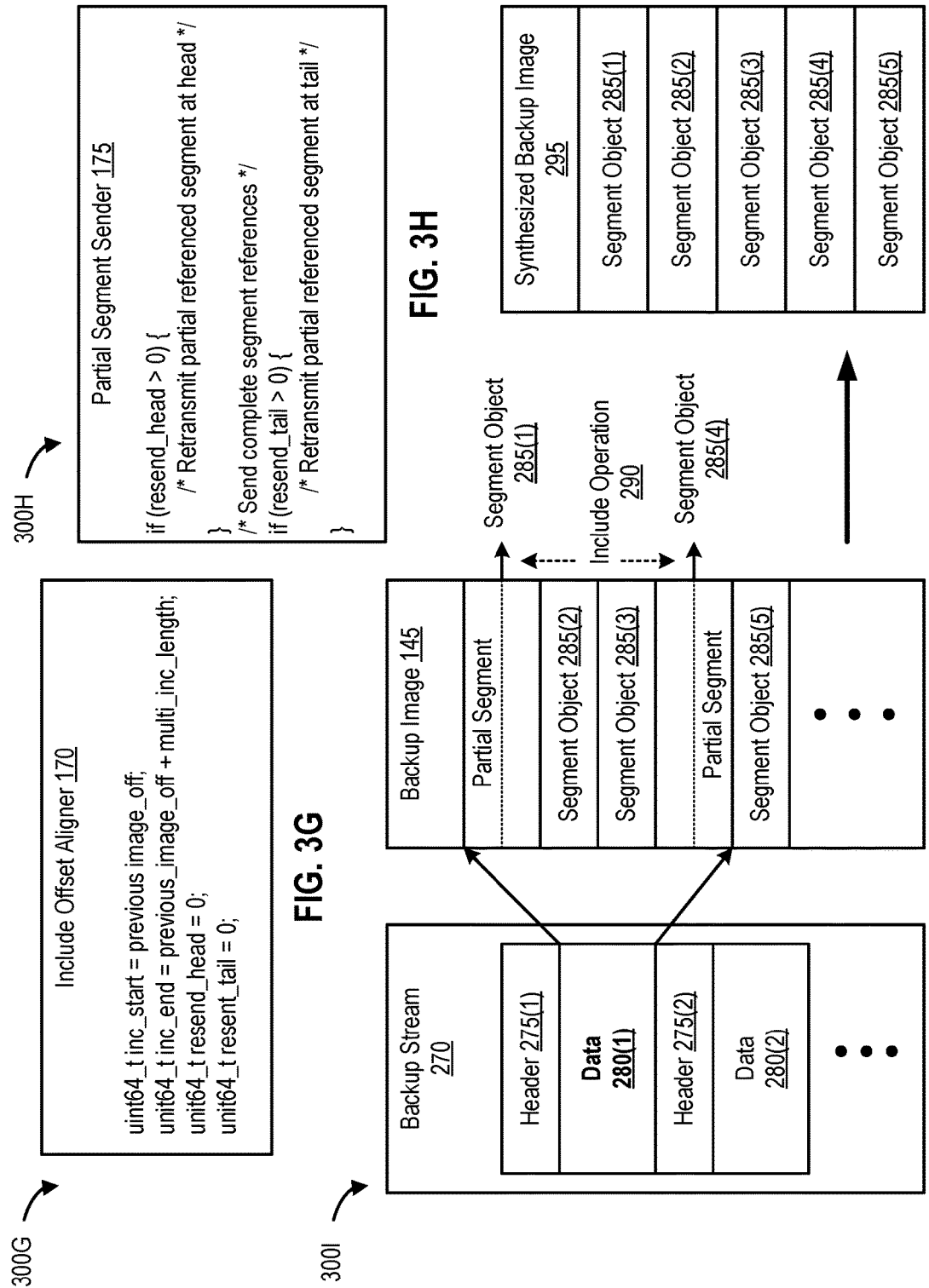

PERFORMANCE OF DEDUPLICATION STORAGE SYSTEMS

FIELD OF THE DISCLOSURE

The present disclosure relates to improving backup and restore performance in deduplication storage environments.

DESCRIPTION OF THE RELATED ART

A synthetic backup operation consolidates a baseline full backup set and several incremental backup sets into a new full backup set. The new full backup set can then be used for further incremental backup operations. Generally, a new full backup of a given data set is preferable to definitively protect the data set in question.

The speed of a synthetic backup operation can be improved by combining changed data with a list of data that has already been backed up during a previous full or incremental backup operation, and deduplicating this combination of data—without reading backup images and/or creating a new backup image. Therefore, by independently tracking and deduplicating data that has already been backed up, such a system only requires changed data to create a synthetic full backup set, for example, in roughly the same time it takes to run an incremental backup operation.

Unfortunately, including partial segments of changed data (e.g., as part of an include operation) to create a synthetic full backup set (e.g., partial segment inclusion) degrades synthetic backup and restore performance in deduplication storage environments.

SUMMARY OF THE DISCLOSURE

Disclosed herein are methods, systems, and processes to improve backup and restore performance in deduplication storage environments. One such method involves receiving a metadata stream that includes data segment offsets that are associated with data segments of a previous backup image, and indicate data segment boundaries. The method determines an offset for an include operation. The offset is a start offset or an end offset. The include operation references one or more data segments, and is part of a request to perform a backup operation. The method then performs the backup operation by modifying the include operation, if the offset involves one or more partial data segments.

In one embodiment, the method aligns the offset of the include operation with a data segment boundary by moving the start offset forward from a first data segment if the first data segment includes a partial data segment, and/or moving the end offset backward from a second data segment if the second data segment includes another partial data segment.

In another embodiment, performing the modified include operation as part of the backup operation includes generating a modified backup stream, and transmitting the partial data segment instead of the first data segment to a media server as part of the modified backup stream if the first data segment includes the partial data segment, and/or transmitting another partial data segment instead of the second data segment to the media server as part of the modified backup stream if the second data segment includes another partial data segment.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings.

FIG. 3A is a block diagram 300A of a backup agent and a media server, according to one embodiment of the present disclosure.

FIG. 3B is a block diagram 300B of a media server, according to one embodiment of the present disclosure.

FIG. 3C is a block diagram 300C of a backup engine and a backup agent, according to one embodiment of the present disclosure.

FIG. 3G is a block diagram 300G of an include offset aligner, according to one embodiment of the present disclosure.

FIG. 3H is a block diagram 300H of a partial segment sender, according to one embodiment of the present disclosure.

FIG. 3I is a block diagram 300I of a deduplication storage system that avoids partial segment inclusion, according to one embodiment of the present disclosure.

Figure 1:
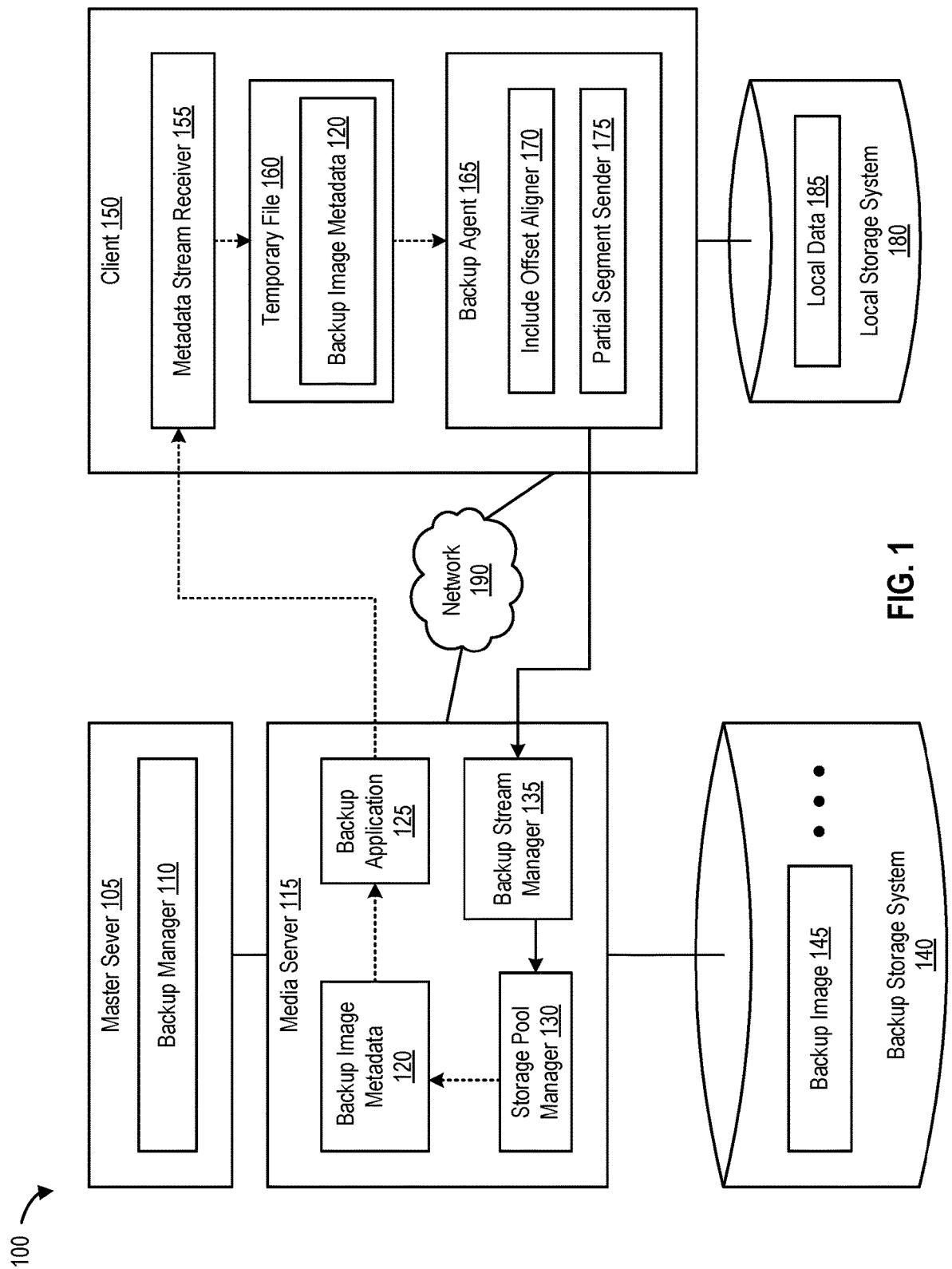
FIG. 1 is a block diagram 100 of a deduplication storage system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Generally, backup operations may be full or incremental. A full backup operation produces a full backup set or a copy of all data—data that has changed as well as data that is unchanged. An incremental backup operation produces an incremental backup set or a copy of only data that has changed (e.g., since a prior full or incremental backup operation).

Some backup systems offer another option. For example, a synthetic full backup operation consolidates a baseline full backup set and several incremental backup sets into a new full backup set. The new full backup set can then be used for further incremental backup operations. Generally, a new full backup of a given data set is preferable to definitively protect the data set in question.

NetBackup Accelerator, provided by Veritas Technologies, LLC of Mountain View, Calif., can provide full backups for the cost of an incremental backup, and can also create a synthetic full backup in approximately the same time needed to run an incremental backup operation. NetBackup Accelerator can improve the speed of a synthetic full backup operation by combining changed data with a list of data that has already been backed up during a previous full or incremental backup operation, and deduplicating this combination of data—without reading backup images and/or creating a new backup image. Therefore, by independently tracking and deduplicating data that has already been backed up, NetBackup Accelerator only requires changed data to create a synthetic full backup set in roughly the same time it takes to run an incremental backup operation.

NetBackup Accelerator implements a platform and file system independent track log to detected changed data and sends the changed (or modified) data (segments) to a media server. NetBackup Accelerator can also deduplicate data and send unique data (e.g., changed and/or modified data segments) directly to a storage server. NetBackup Accelerator can be used to perform backup and recovery in open storage environments.

Unfortunately, as previously noted, partial segment inclusion causes synthetic backup speed degradation in deduplication based storage systems. For example, if a backup operation starts in the middle of a data segment (hereinafter "segment"), partial segment inclusion typically requires at least the following steps: (1) data in the buffer to be flushed as a new segment, (2) the partial segment to be read from backend storage, (3) the partial segment to be flushed as another new segment, and (4) any intervening segment references to be copied to a target image (e.g., a current backup image). These steps typically have to be repeated for every partial data segment (e.g., for all head portion and tail portion of the first and last segments of an include operation). As will be appreciated, these extraneous steps can cause performance-related problems with respect to backup and restore operations in client-side deduplication storage systems.

For example, from a backup operation perspective, reading data from backend storage is very slow compared to reading data from front end storage (e.g., a virtual disk), particularly if partial segments are being read to form a new small segment. For example, if multiple small files have been changed and/or modified, multiple small includes (e.g., in include operations) will slow down backup performance significantly. In addition, splitting new segments (e.g., into smaller segments) requires fingerprint recalculation, compression, encryption, and data transmission—a laborious process to say the least.

From a restore operation perspective, multiple segments with the same total data size means worse locality, resulting in slower restore speed. Splitting segments in this manner can affect segment distribution, causing rehydration or tape out problems. For example, fragmentation of data backed up in a synthetic full backup can negatively affect rehydration performance.

Disclosed herein are methods, systems, and processes to improve backup and restore performance in deduplication storage environments. One technology that can employ such methods, systems, and processes is NetBackup Accelerator, provided by Veritas Technologies, LLC of Mountain View, Calif.

Examples of Client-Side Deduplication Storage Systems

FIG. 1 is a block diagram 100 of a deduplication storage system, according to one embodiment. As shown in FIG. 1, such a system includes a master server 105, a media server 115, and a client 150. Master server 105, media server 115, and client 150 can be any of a variety of different types of computing devices, including a server, personal computing device, laptop computer, cellular phone, or the like.

Master server 105 implements a backup manager 110. Media server 115 has access to backup image metadata 120 and implements a backup application 125, a storage pool manager 130, and a backup stream manager 135. Media server 115 is coupled to backup storage system 140. Backup storage system 140 stores one or more backup images (e.g., backup image 145).

Client 150 implements a metadata stream receiver 155 and stores a temporary file 160. Temporary file 160 includes backup image metadata 120 (e.g., generated and/or accessed by media server 115). Client 150 also includes a backup agent 165 that implements an include offset aligner 170, a partial segment sender 175, and can include a changed block tracker. Client 150 is coupled to local storage system 180. Local storage system 180 stores local data 185.

Media server 115 and client 150 are communicatively coupled to each other via a network 190. Any type of network and/or interconnection other than network 190 (e.g., the Internet) can be used to facilitate communication between media server 115 and client 150.

Figure 2A:
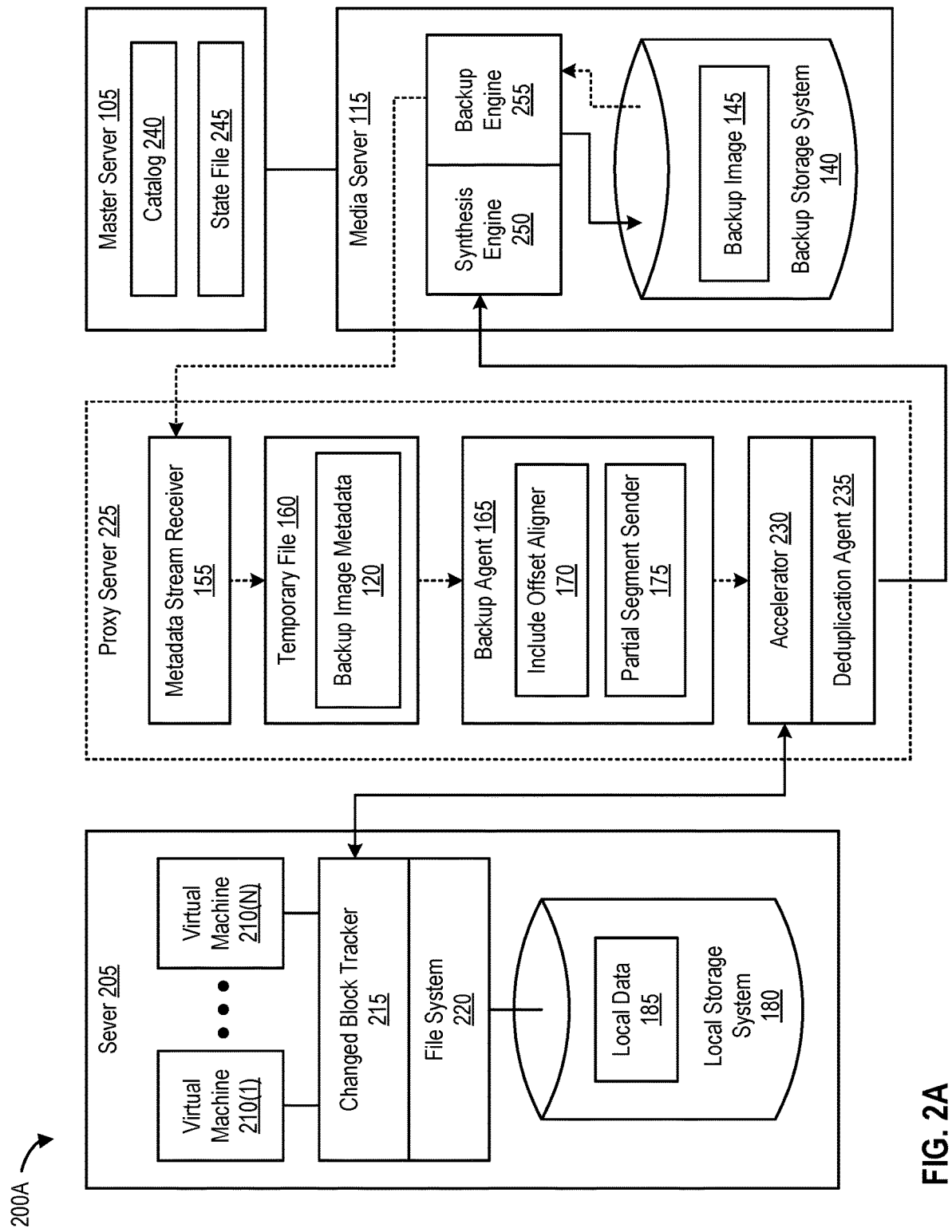
FIG. 2A is a block diagram 200A of a computing system that performs client-side deduplication, according to one embodiment of the present disclosure.

FIG. 2A is a block diagram 200A of a computing system that performs client-side deduplication, according to one embodiment. FIG. 2A includes a server 205, a proxy server 225, master server 105, and media server 115. Server 205 implements virtual machines 210(1)-(N), and includes a changed block tracker 215, a file system 220, and local storage system 180 (which stores local data 185). Server 205 and media server 115 can be communicatively coupled to each other via a network 190, or any type of network and/or interconnection.

Proxy server 225, which in some embodiments is implemented by server 205 (e.g., on a client-side), includes an accelerator 230 and a deduplication engine 235. In addition, proxy server 225 can be implemented as client 150 (as shown in FIG. 1) and can implement metadata stream receiver 155, temporary file 160, and backup agent 165. Master server 105 includes a catalog 240 and a state file 245. It will be appreciated that, while state file 245 is depicted as being maintained at master server 105, such need not necessarily be the case. State file 245 can be maintained on media server 115 or at any location in the computing system of FIGS. 1 and 2A. Media server 115 includes synthesis engine 250 and backup engine 255. Backup engine 255 is coupled to backup storage system 140, which can be used to store one or more backup images (e.g., backup image 145) of one or more corresponding backup sets.

To create a synthetic full back up set, accelerator 230 first requests and obtains changed storage units (e.g., for each virtual disk included in a backup operation) from virtual machine 210(1). Virtual machine 210(1) running on server 205 can track storage units (e.g., disk sectors) that have changed, using changed block tracker 215, for example. Once identified, changed storage units from virtual machine 210(1) are sent to proxy server 225.

State file 245, which stores information about each storage unit (e.g., about each extent of data on a virtual disk), is obtained and/or retrieved from master server 105. In some embodiments, state file 245 can be made available on proxy server 225, which in this example, functions as a virtual machine proxy host and/or a backup host. State file 245 includes information about storage units which have already been backed up to backup storage system 140 by backup engine 255 (e.g., as part of a previous full or incremental backup). Based on the information in state file 245, accelerator 230 combines changed storage units with a list of storage units that have been already backed up. Accelerator 230 then transfers this combined data and information to deduplication engine 235. Once this combined data is deduplicated (e.g., to remove storage units that have been already and/or previously backed up), a synthetic full backup is generated on media server 115 (e.g., using synthesis engine 250). State file 245 is then updated by media server 115 and transferred to master server 105 after the backup of each virtual disk is completed.

It should be noted that accelerator 230 need only generate catalog data for the changed storage units. When media server 115 generates the synthetic full backup (e.g., using synthesis engine 250 as noted above), accelerator 230 transfers catalog information (e.g., information noting the location of the storage units in a backup image) for a full backup to master server 105. Therefore, a synthetic full backup operation performed using the computing systems of FIGS. 1 and 2A typically consumes as much catalog space as a traditional full backup, though catalog information can be stored incrementally, as well.

However, since accelerator 230 only requires changed data to create a synthetic full backup set, accelerator 230 can create the synthetic full backup set in approximately the same amount of time it takes to create an incremental backup set—a significant time-saving advantage. Further, by only sending the data and metadata for a full backup occasionally (and just incremental backups in between), such an approach avoids wasteful redundant operations. Unfortunately, and as noted above, partial segment inclusion during the creation of a synthetic full backup set causes synthetic backup speed degradation in deduplication based storage systems of FIGS. 1 and 2A.

Figure 2B:
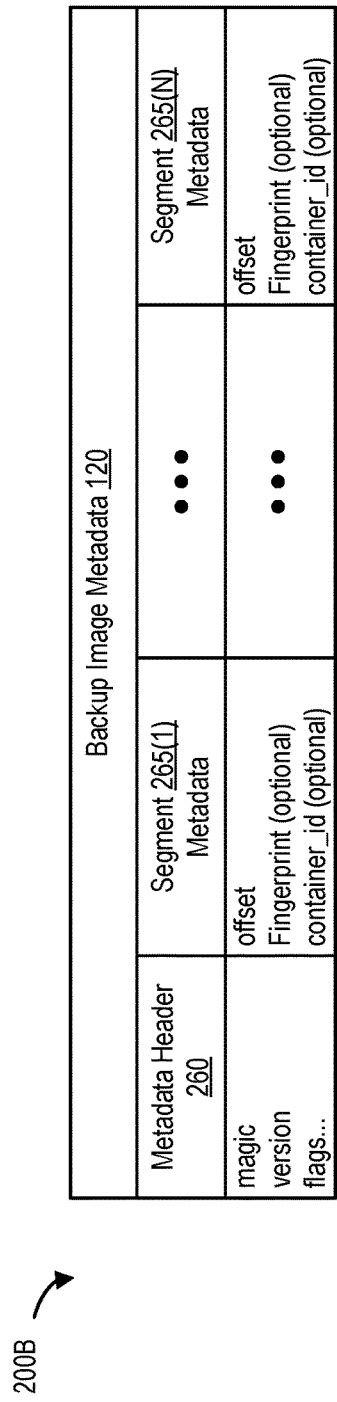
FIG. 2B is a table 200B of backup image metadata, according to one embodiment of the present disclosure.

FIG. 2B is a table 200B of backup image metadata, according to one embodiment. Backup image metadata 120 is metadata related to and associated with backup image 145 (e.g., a previous backup image such as backup image 145) stored on backup storage system 140 (e.g., a backend physical storage unit). As shown in FIG. 3B, backup image metadata 120 identifies a metadata header 260 as well as metadata for each of segments 265(1)-(N) (e.g., segment offset, fingerprint, containerID, and the like).

Figure 2C:
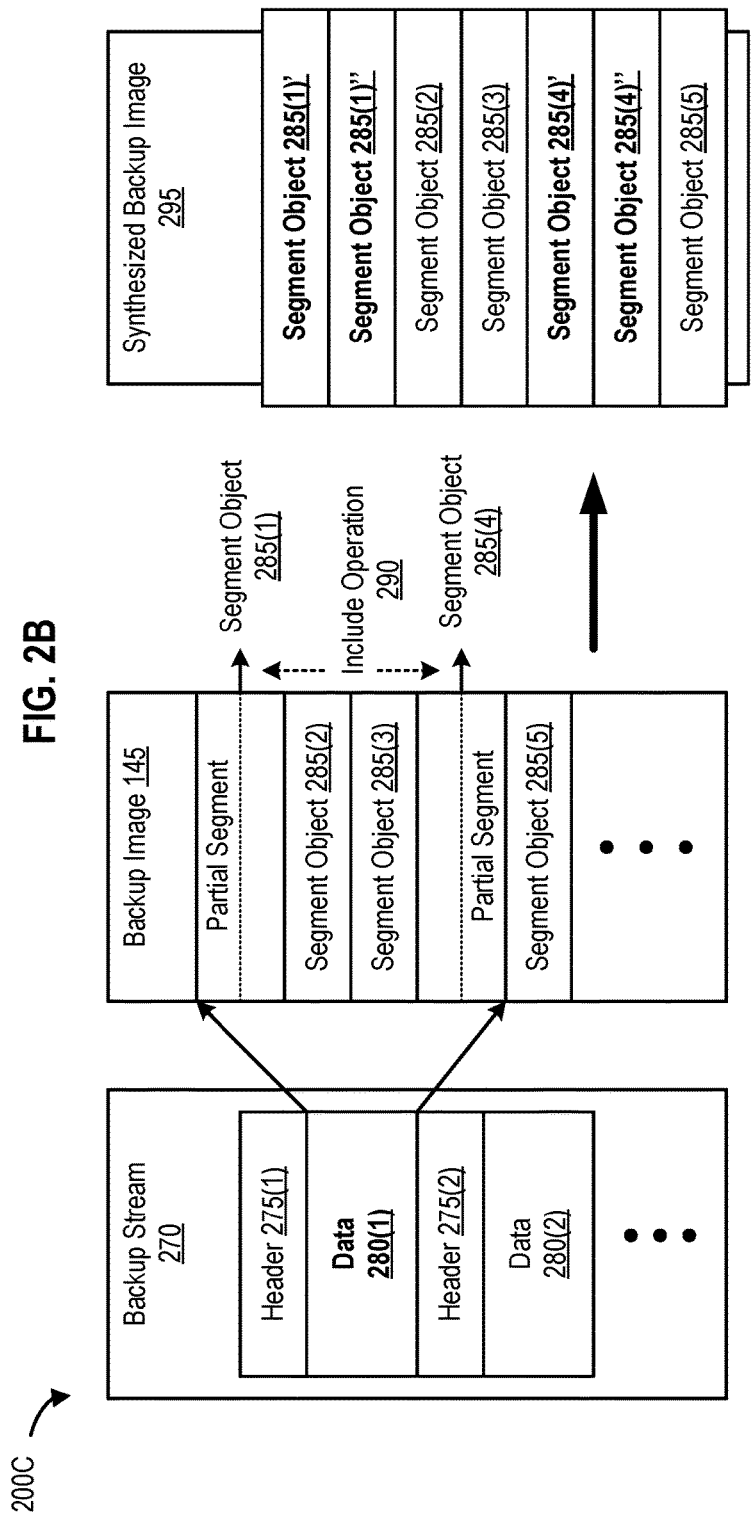
FIG. 2C is a block diagram 200C of a deduplication storage system that performs partial segment inclusion, according to one embodiment of the present disclosure.

FIG. 2C is a block diagram 200C of a deduplication storage system that performs partial segment inclusion, according to one embodiment. One reason for including partial segments arises if a backup operation starts in the middle of a segment. As shown in FIG. 2C, a backup stream 270 includes a header 275(1) and data 280(1), and can be represented as a backup image (e.g., a tar image) for a current (or ongoing) backup operation (e.g., backup image 145). Backup stream 270 is created by backup agent 165 and send to media server 115.

Data 280(1) in backup stream 270 includes four segment objects in backup image 145. For example, as shown in FIG. 2C, data 280(1) is part of segment object 285(1), is part of segment objects 285(2) and 285(3), and is partially part of segment object 285(4). Segment objects 285(1)-(5) represent data objects that can be (possibly) deduplicated by deduplication agent 235. Include operation 290 instructs synthesis engine 250 in media server 115 to "copy or reference" data from a previous backup image or a source backup image (e.g., backup image 145 as shown in FIGS. 1 and 2A).

If an include operation (e.g., include operation 290) involves partially referenced segments (e.g., segment object 285(1) and 285(4) as shown in FIG. 2C), the partially referenced segment has to be included my media server 115 (e.g., during a synthetic full backup operation). As previously noted, such an inclusion requires at least the following steps: (1) data in the buffer (e.g., the upper portion of segment object 285(1)) has to be flushed as a new segment (e.g., segment object 285(1)'), (2) the partial segment (e.g., the lower portion of segment object 285(1)) has to be read from backend storage (e.g., from backup storage system 140), (3) the partial segment (e.g., the lower portion of segment object 285(1)) has to be flushed as another new segment (e.g., segment object 285(1)"), and (4) any intervening segment references (e.g., segment objects 285(2) and 285(3)) have to be copied to a target backup image (e.g., synthesized backup image 295). These steps typically have to be repeated for every partial data segment (e.g., segment object 285(4)).

As will be appreciated, these laborious steps can cause performance related problems and degradations with respect to backup and restore operations in client-side deduplication storage systems at least because: (1) reading data from backup storage system 140 is very slow compared to reading data from local storage system 180, (2) reading back partial segments to form a new small segment (e.g., segment object 285(1)") requires fingerprinting, compression, encryption, and transmission of segments, and (3) splitting data into more segments (e.g., segment object 285(1)' and 285(1)" results in worse data locality (e.g., because of the creation of multiple small segments with the same total data size). Issues related to rehydration as well as tape out problems can also occur.

Example of Defining and Transmitting a Metadata Stream

As noted with reference to FIG. 2B, backup image metadata 120 is metadata related to and associated with backup image 145 (e.g., a previous backup image such as backup image 145) stored on backup storage system 140 (e.g., a backend physical storage unit). As shown in FIG. 3B, backup image metadata 120 identifies a metadata header 260 as well as metadata for each of segments 265(1)-(N) (e.g., segment offset, fingerprint, containerID, and the like).

In one embodiment, a metadata stream of a previous backup image (e.g., backup image 145) is defined, and is then transmitted from media server 115 to backup agent 165 at the start of a backup operation. For example, media server 115 can instruct storage pool manager 130 to retrieve metadata associated with backup image 145 from backup storage system 140. This metadata can be stored as backup image metadata 120 by media server 115 and sent (or transmitted) to backup agent 165 in client 150 via network 190.

Example of Converting Offsets of Segments

FIG. 3A is a block diagram 300A of a backup agent and a media server, and FIG. 3B is a block diagram 300B of a media server, according to some embodiments. Backup agent 165 generates backup stream 270 and transmits backup stream 270 to media server 115. Media server 115 splits backup stream 270 into backup image metadata 120 (e.g., PD .hdr) and backup image 145 (e.g., PD .img). In one embodiment, the image format for backup stream 270 is "tar" (e.g., shown as archive stream 305 in FIG. 3B).

In this example, if a particular file needs to be backed up, a tar header is created for the file (e.g., header file 310) based on the file's statistics information (e.g., file size, ownership, and the like). In this example, archive stream 305 (e.g., backup stream 270) can be split by a storage server (e.g., media server 115) into header file 310 (e.g., PD .hdr) and a data image file (e.g., PD .img). As shown in FIG. 3B, header file 310 includes archive header(s) 320 and data image file 315 includes backup data 325.

FIG. 3C is a block diagram 300C of a backup engine and a backup agent, according to one embodiment. Backup engine 255 implements an offset converter 330. Because header file 310 and data image file 315 are stored separately, offset converter 330 converts segment offsets of a previous backup image (e.g., backup image 145) to offsets based on a current backup image (e.g., backup stream 270 or archive stream 305). Backup agent 255 includes include offset aligner 170 and partial segment sender 175. Include offset aligner 170 ensures that offsets for alignment are offsets based on backup stream 270 (e.g., archive stream 305) because backup agent 165 does not have information regarding backup image 145 (e.g., data image file 315).

As previously noted, metadata associated with a previous backup image is sent from media server 115 to client 150. In some embodiments, metadata retrieval functionality can be implemented using an Open Storage Technology (OST) interface (e.g., sts_read_metastream). For example, image segment information (e.g., fingerprint, container_id, segment object size, and the like) is extracted by backup engine 255 (implemented in media server 115), and segment start offsets are calculated by offset converter 330 by accumulating each segment's size. Then, offset converter 330 converts segment offsets based on data image file 315 to offsets based on backup image 145. The (converted) offsets are segment boundaries, and in one embodiment, can be retrieved using the OST interface (e.g., sts_read_metastream). The (converted) offsets are sent to backup agent 165 as part of the metadata stream from media server 115 to client 150.

Figure 3D:
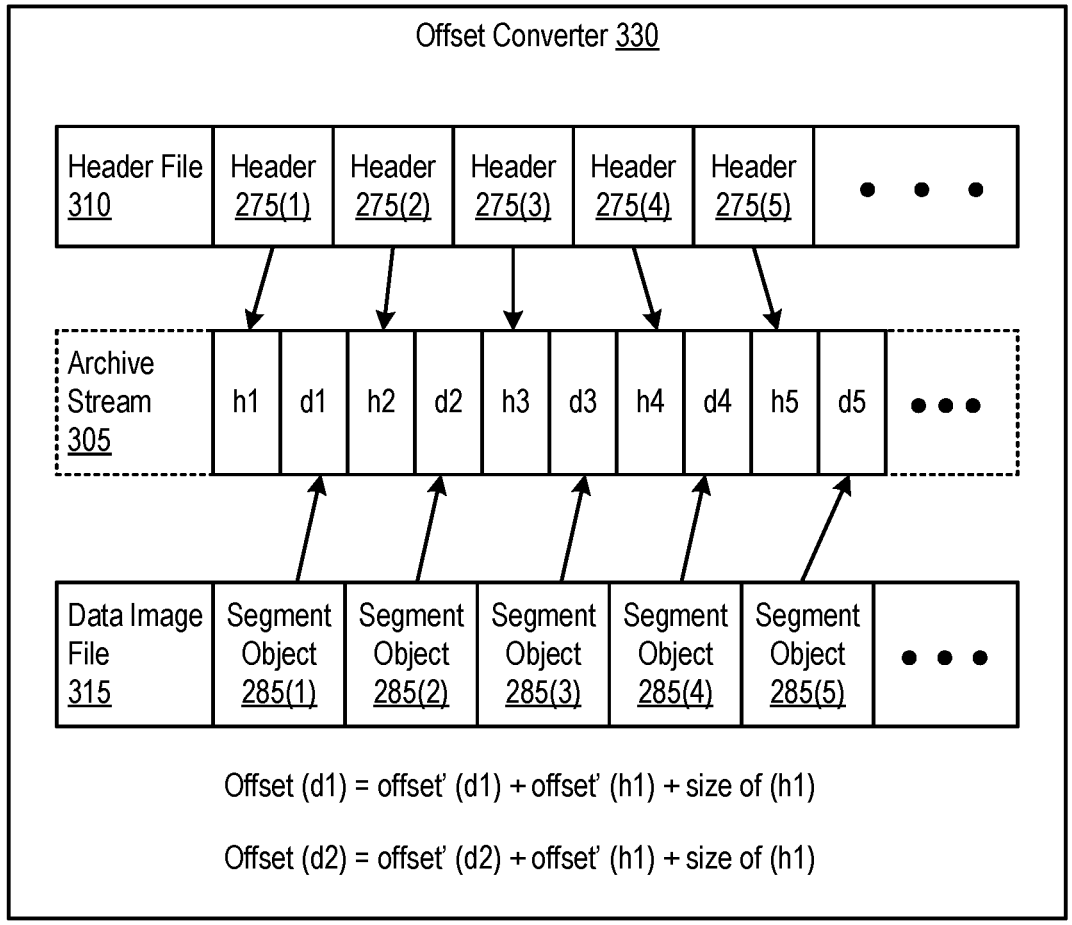
FIG. 3D is a block diagram 300D of an offset converter, according to one embodiment of the present disclosure.

FIG. 3D is a block diagram 300D of an offset converter, according to one embodiment. As shown in FIG. 3D, header file 310 includes header 275(1)-(N). Headers 275(1)-(5) are represented as h1-h5 in archive stream 305. Similarly, data file image 315 includes segment objects 285(1)-(N). Segment objects 285(1)-(5) are represented as d1-d5 in archive stream 305. Offset converter 300 converts segment offsets based on backup image 145 (e.g., data image file 315 or previous PD .img file) to offsets based on backup stream 270 (e.g., archive stream 305 or a tar image for a current backup operation). Offset converter 300 performs this conversion process at least because header file 310 (e.g., PD .hdr file) and data image file 315 are stored separately. In some embodiments, d1 may include only segment object 285(1). In other embodiments, d1 may include multiple segment objects (e.g., 285(1) and 285(2)).

Example of Aligning Include Offset with Segment Boundary

Figure 3E:
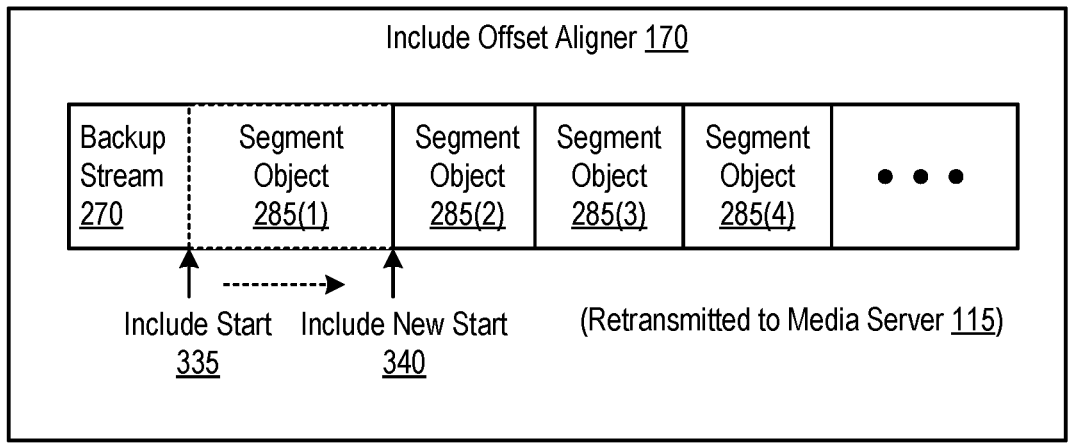
FIG. 3E is a block diagram 300E of an include offset aligner, according to one embodiment of the present disclosure.

FIG. 3E is a block diagram 300E of an include offset aligner, according to one embodiment. Include offset aligner 170 permits the alignment of an include offset with a segment boundary, for example, to determine which parts need to be transmitted to media server 115 from client 150. In one embodiment, offsets to be included in a target image (e.g., synthesized backup image 295) for a current backup (e.g., backup stream 270) are aligned.

Because backup agent 165 does not know how a previous backup image (e.g., backup image 145) is stored on a storage server (e.g., media server 115), it is possible that an include operation to copy of reference data from a previous backup image can start or end in the middle of a segment object (e.g., the partial segment inclusion problem as shown in FIG. 2C). Therefore, include offset aligner 170 modifies the include offset to avoid a reference to a partial segment. For example, as shown in FIG. 3E, include offset aligner 170 moves include start 335 in backup stream 270 from the middle of segment object 285(1) (which is a partially referenced segment object) to segment object 285(2) as include new start 340. In this manner, include offset aligner can identify and instruct partial segment sender 175 to retransmit parts of a partially referenced segment object from local storage system 180 to media server 115.

Examples of Avoiding and Retransmitting Partially Referenced Segments

Figure 3F:
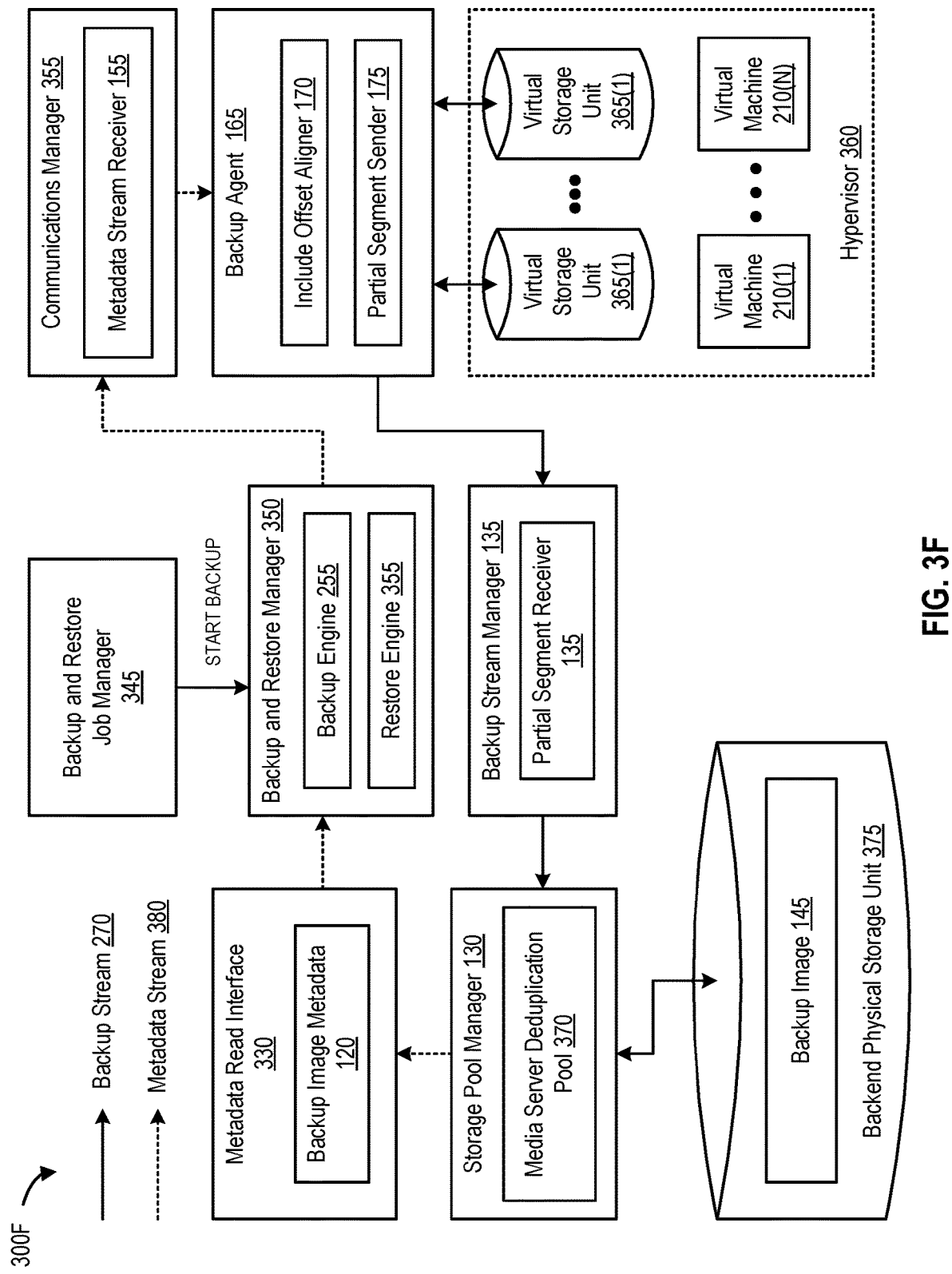
FIG. 3F is a block diagram 300F a deduplication storage system, according to one embodiment of the present disclosure.

FIG. 3F is a block diagram 300F a deduplication storage system that avoids partial segment reference and instead retransmits the partially referenced segment, according to one embodiment. First, backup and restore job manager 345 sends a request to backup and restore manager 350 to start a backup operation. Backup engine 255 in backup and restore manager 350 initiates a backup operation by requesting and then receiving backup image metadata 120 from metadata read interface 330 (e.g., an OST interface). Metadata read interface 330 receives backup image metadata 120 from storage pool manager 130 which implements a media server deduplication pool 370, and is communicatively coupled to backend physical storage unit 375, which contains backup image 145.

Backup and restore manager 350 generates a metadata stream 380 with backup image metadata 120 and sends metadata stream 380 containing backup image metadata 120 to communications manager 355. Communications manager 355 receives metadata stream 380 from media server 115 via metadata stream receiver 155, and transmits the metadata stream 380 along with backup image metadata 120 to backup agent 165.

FIG. 3G is a block diagram 300G of an include offset aligner, according to one embodiments. Metadata stream 380 that is received by backup agent 165 includes one or more data segment offsets that are associated with segments of a previous backup image (e.g., backup image 145 stored on backend physical storage unit 375 or backup storage system 140). The one or more segment offsets indicate segment boundaries. Once metadata stream 380 is received by backup agent 165, include offset aligner 170 determines an offset (e.g., a start offset or an end offset) for an include operation (e.g., an operation to "copy or reference" data from a previous backup image such as backup image 145). In this example, the include operation references one or more segments, and is part of a request to perform a backup operation. Backup agent 165 then performs the backup operation by modifying the include operation using include offset aligner 170, if the offset involves one or more partial data segments.

FIG. 3H is a block diagram 300H of a partial segment sender, according to one embodiment. For example, include offset aligner 170 can align the offset of the include operation with a data segment boundary by moving the start offset forward from a first data segment if the first data segment includes a partial data segment, and/or moving the end offset backward from a second data segment if the second data segment includes another partial data segment. Backup agent 165 then performs the modified include operation as part of the backup operation by generating a modified backup stream, and partial segment sender 175 transmits the partial data segment instead of the first data segment to media server 115 as part of the modified backup stream if the first data segment includes the partial data segment, and/or transmits another partial data segment instead of the second data segment to the media server as part of the modified backup stream if the second data segment includes another partial data segment. Include offset aligner 170 avoids the need for inclusion of partially referenced segments, and partial segment sender 175 avoids the need for retrieval of such partial segments from backend storage.

FIG. 3I is a block diagram 300I of a deduplication storage system that avoids partial segment inclusion, according to one embodiment. Include offset aligner 170 aligns the include offset with a segment boundary to determine which parts (e.g., of the partially referenced segment) needs to be retransmitted from client 150 to media server 115. This alignment process is performed for both the head and tail segments of an include operation as shown in FIG. 3I. In addition, partial segment sender 175 retransmits the partial segments (e.g., partially referenced portions of segment objects 285(1) and 285(4)) as part of backup stream 270 to backup stream manager 135. Partial segment receiver 135 then combines the retransmitted partial segments with their corresponding parts prior to performing deduplication.

Processes to Improve Performance of Deduplication Storage Systems

Figure 4A:
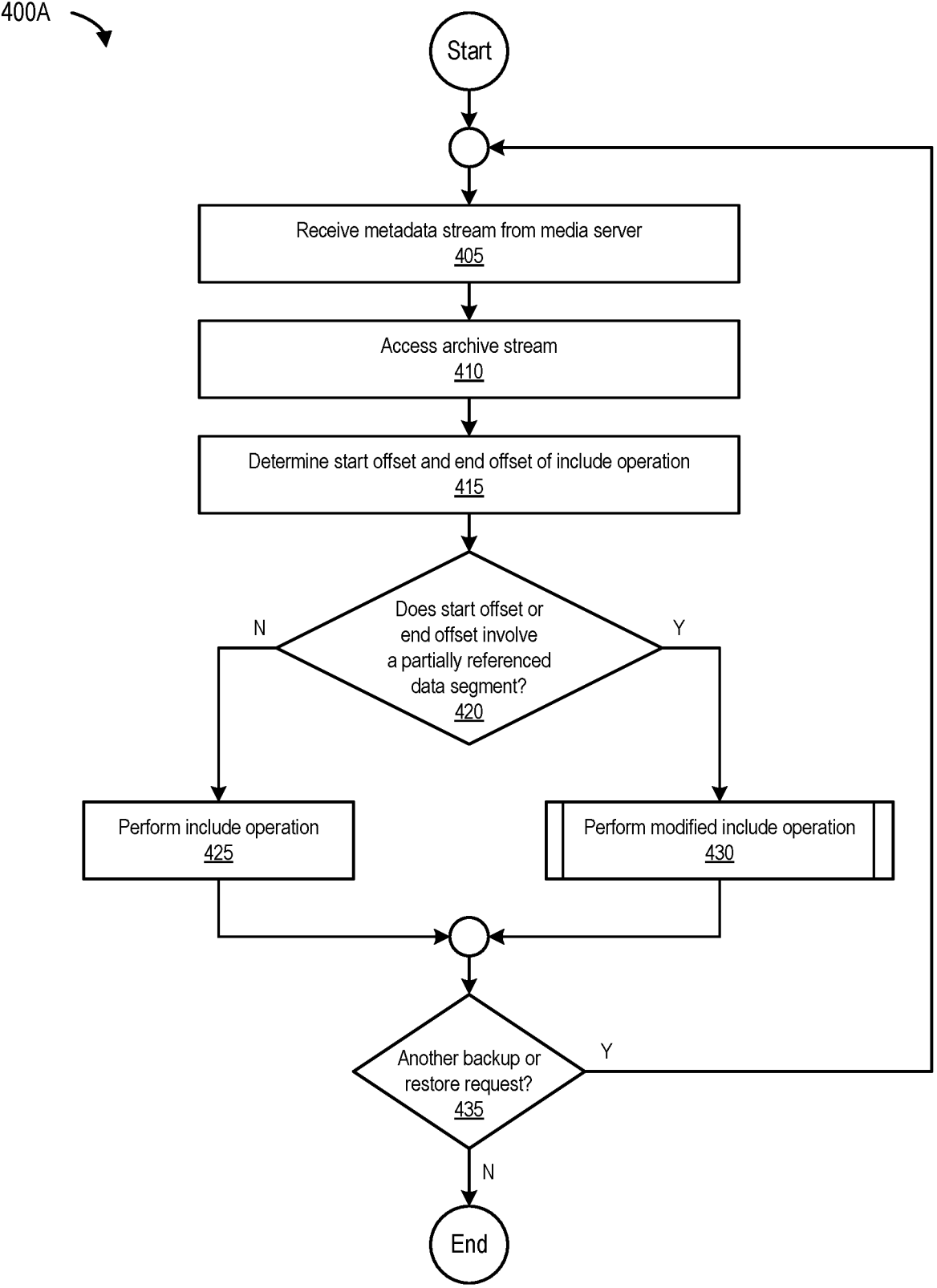
FIG. 4A is a flowchart 400A of a process for identifying a partially referenced data segment, according to one embodiment of the present disclosure.

FIG. 4A is a flowchart 400A of a process for identifying a partially referenced data segment, according to one embodiment. The process begins at 405 by receiving a metadata stream from a media server. At 410, the process accesses an archive stream, and at 415, determines a start offset and an end offset of an include operation. At 420, the process determines whether the start offset or the end offset involve a partially referenced data segment.

If the start offset or the end or the end offset do not involve a partially referenced data segment, the process, at 425, performs the include operation. However, if the start offset or the end offset involve a partially referenced data segment, the process, at 430, performs a modified include operation. At 435, the process determines if there is another backup or restore request. If there is another backup or restore request, the process loops to 405. Otherwise, the process ends.

Figure 4B:
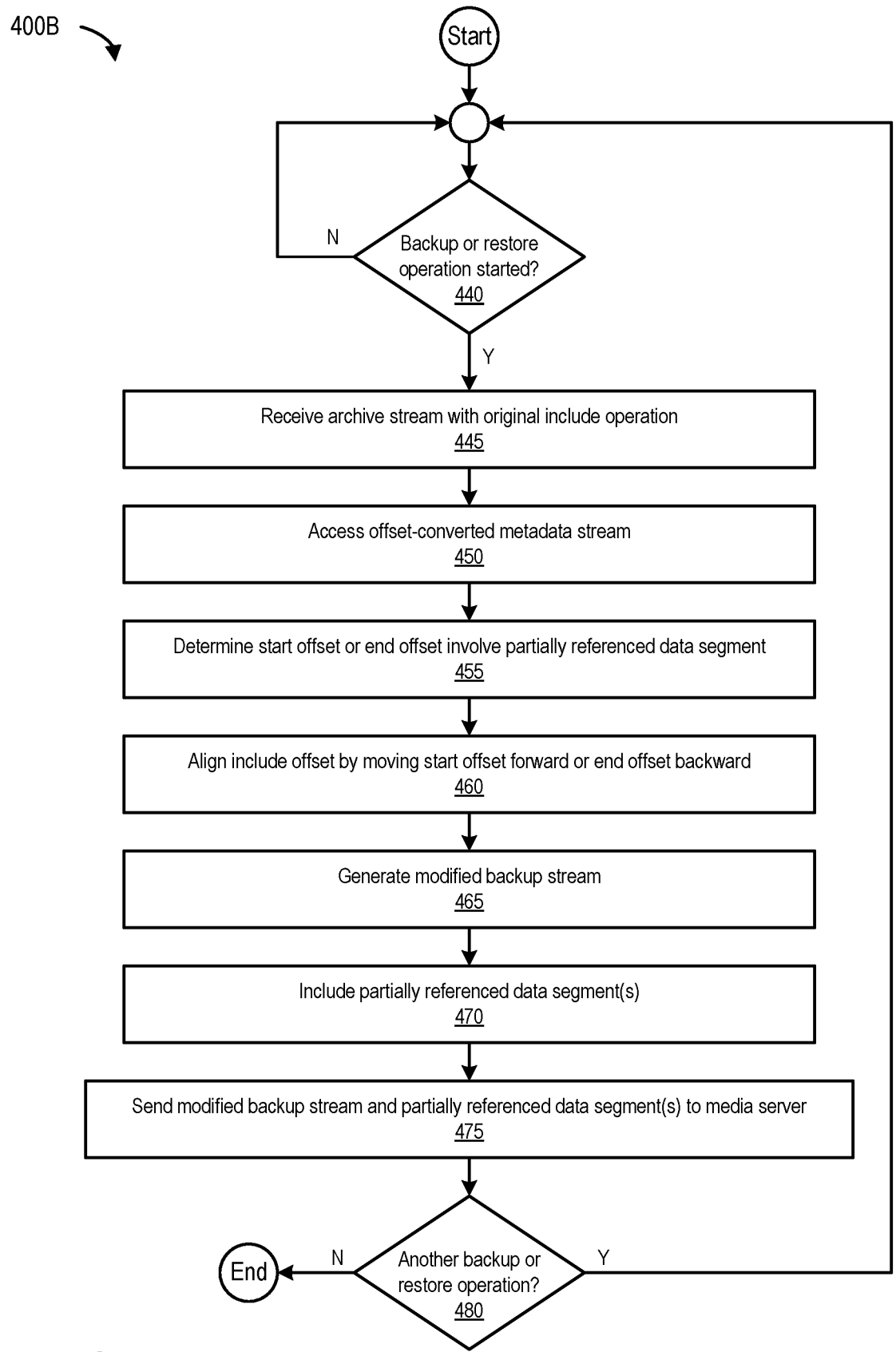
FIG. 4B is a flowchart 400B of a process for avoiding partial segment inclusion, according to one embodiment of the present disclosure.

FIG. 4B is a flowchart 400B of a process for avoiding partial segment inclusion, according to one embodiment. The process begins at 440 by determining whether a backup or restore operation has been started. If no backup or restore operation has been started, the process loops back to 440. However, if a backup or restore operation has been started, the process, at 445, receives an archive stream with an original include operation. At 450, the process accesses an metadata stream, and at 455, determines a start offset or an end offset of partially referenced data segment(s).

At 460, the process aligns an include offset by moving the start offset forward or the end offset backward, and at 465, the process generates a modified backup stream. At 470, the process includes the partially referenced data segment(s), and at 475, the process sends the modified backup stream as well as the partially referenced data segment(s) to a media server. At 480, the process determines if there is another backup or restore operation. If there is another backup or restore operation, the process loops back to 445. Otherwise, the process ends.

Figure 5:
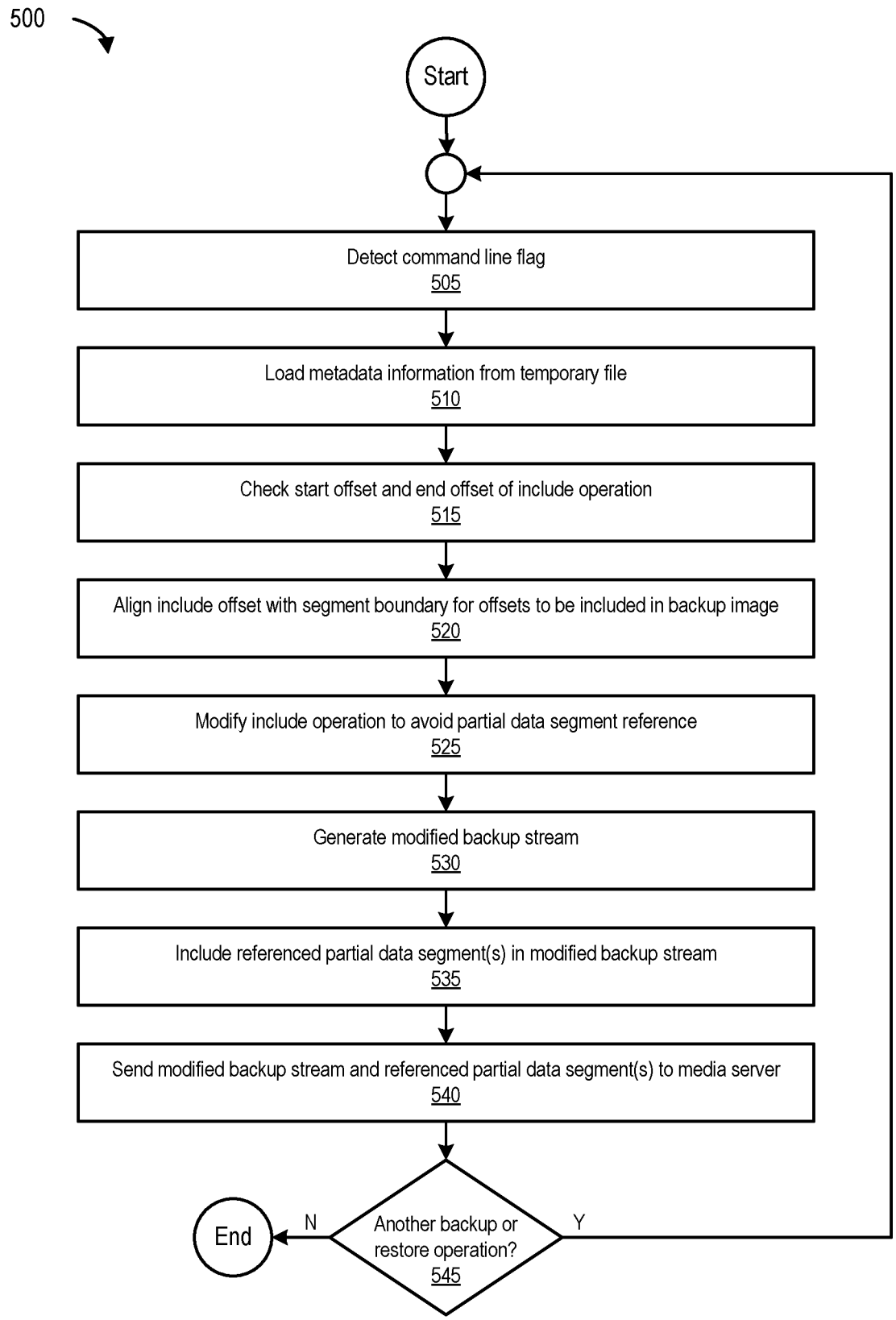
FIG. 5 is a flowchart 400 of a process for generating a modified backup stream, according to one embodiment of the present disclosure.

FIG. 5 is a flowchart 400 of a process for generating a modified backup stream, according to one embodiment. The process begins at 505 by detecting a command line flag. At 510, the process loads metadata information from a temporary file, and at 515, the process checks a start offset and an end offset of an include operation. At 520, the process aligns an include offset with segment boundaries for offsets to be included in a backup image.

At 525, the process modifies the include operation to avoid the partial data segment reference, and at 530, the process generates a modified backup stream. At 535, the process includes the partially referenced data segment(s) in the modified backup stream, and at 540, the process sends the modified backup stream along with the referenced partial data segment(s) to a media server. At 545, the process determines if there is another backup or restore operation. If there is another backup or restore operation, the process loops back to 505. Otherwise, the process ends.

Figure 6:
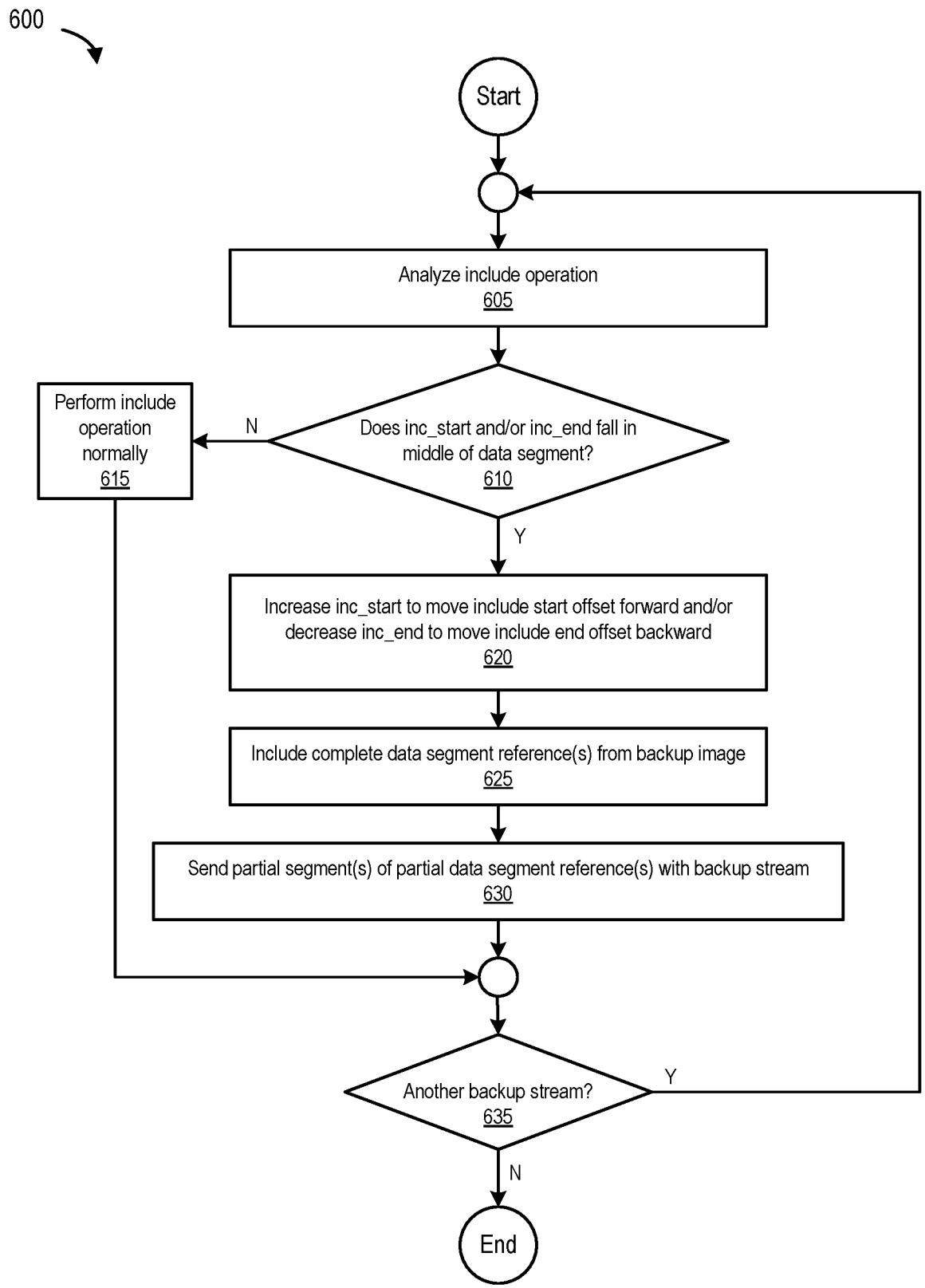
FIG. 6 is a flowchart 600 of a process for aligning include offsets, according to one embodiment of the present disclosure.

FIG. 6 is a flowchart 600 of a process for aligning include offsets, according to one embodiment. The process begins at 605 by analyzing an include operation. At 610, the process determines whether a start offset (e.g., inc_start) or an end offset (e.g., inc_end) in the include operation falls in the middle of a data segment. If the start offset or the end offset does not fall in the middle of a data segment, the process, at 615, performs the include operation normally and loops to 635. However, if the start offset or the end offset does fall in the middle of a data segment, the process, at 620, increases inc_start to move the start offset forward and/or decreases inc_end to move the end offset backward.

At 625, the process includes complete data segment reference(s) from a backup image, and at 630, the process sends (or transfers) only the partial data segment(s) of the partial data segment reference(s) with a (modified) backup stream. At 635, the process determines if there is another backup stream. If there is another backup stream, the process loops back to 605. Otherwise, the process ends.

Figure 7:
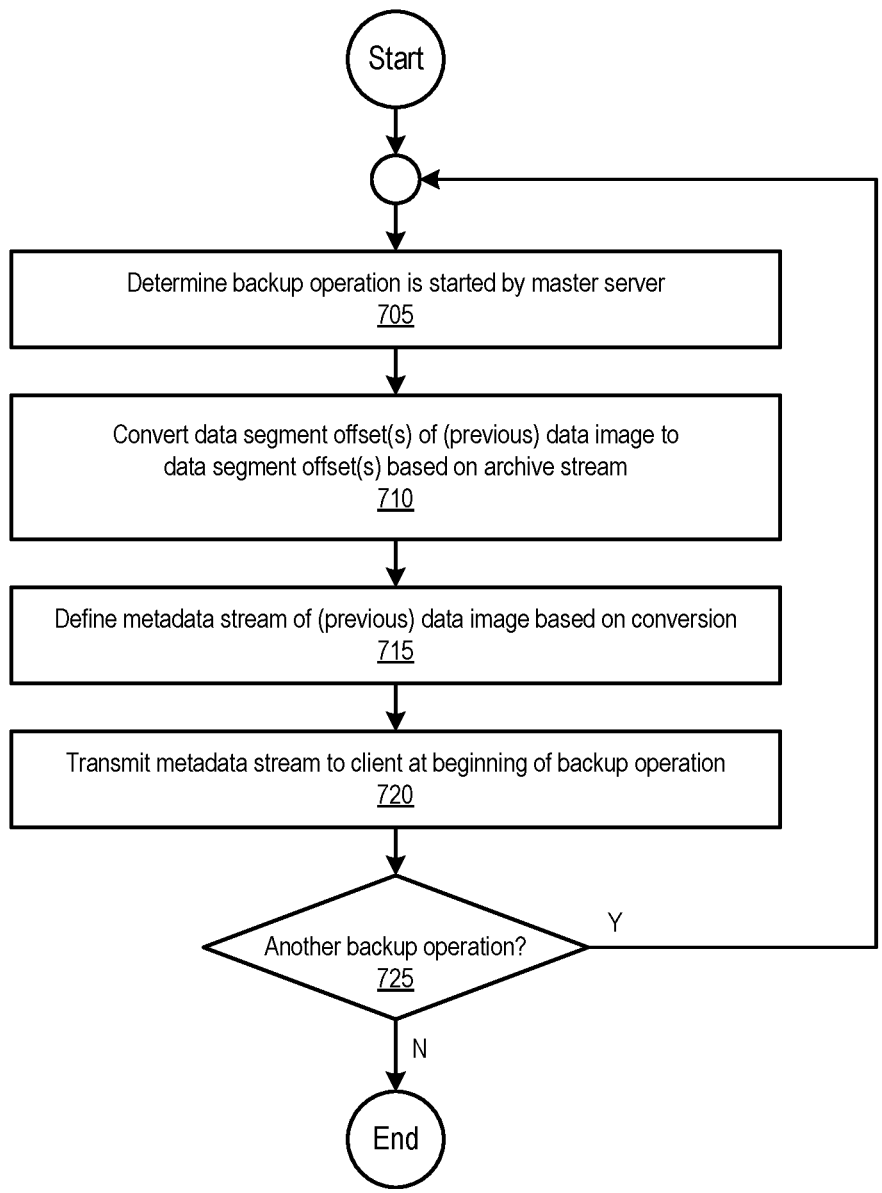
FIG. 7 is a flowchart 700 of a process for defining and transmitting a metadata stream, according to one embodiment of the present disclosure.

FIG. 7 is a flowchart 700 of a process for defining and transmitting a metadata stream, according to one embodiment. The process begins at 705 by determining that a backup operation has been started by a master server. At 710, the process converts data segment offset(s) of a (previous) data image to data segment offset(s) based on an archive stream. At 715, the process defines a metadata stream of the (previous) data image based on the conversion, and at 720, the process transmits the metadata stream to a client at the beginning of the backup operation. At 725, the process determines if there is another backup operation. If there is another backup operation, the process loops back to 705. Otherwise, the process ends.

Therefore, it will be appreciated that the methods, systems, and processes described herein improve backup and restore performance in deduplication storage environments.

Example Computing Environment

Figure 8:
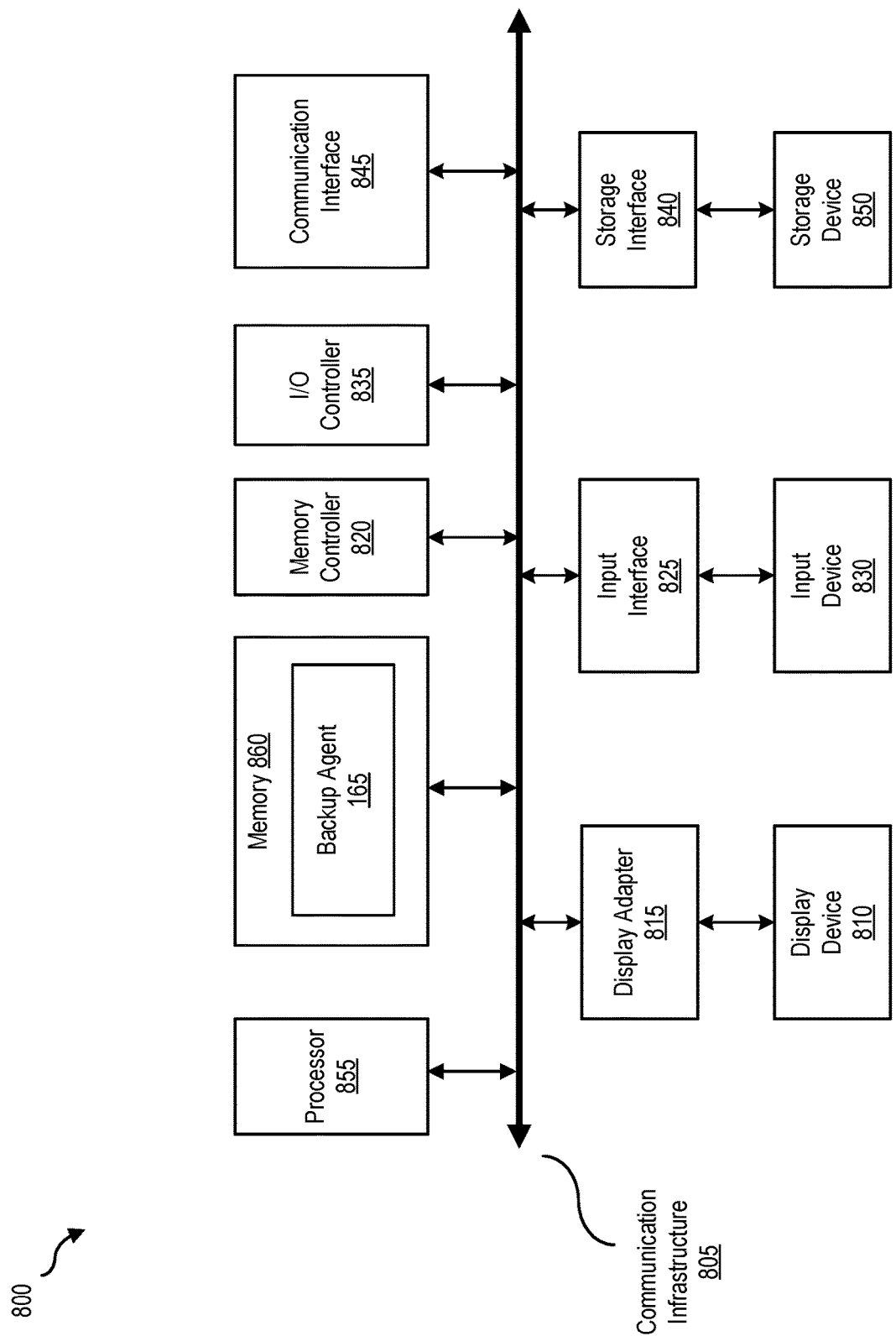
FIG. 8 is a block diagram of a computing system 800 that performs data replication between heterogeneous storage servers, according to one embodiment of the present disclosure.

FIG. 8 is a block diagram of a computing system 800 that improves backup and restore performance in deduplication storage environments, according to one embodiment. Computing system 800 (e.g., master server 105, media server 115, client 150, server 205, and/or proxy server 225) and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like.

In its most basic configuration, computing system 800 may include at least one processor 855 and a memory 860. By executing the software that implements a backup agent 165, computing system 800 becomes a special purpose computing device that is configured to improve backup and restore performance in deduplication storage environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 (e.g., memory of master server 105, media server 115, client 150, server 205, and/or proxy server 225) generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing backup agent 165 may be loaded into memory 860.

In certain embodiments, computing system 800 may also include one or more components in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
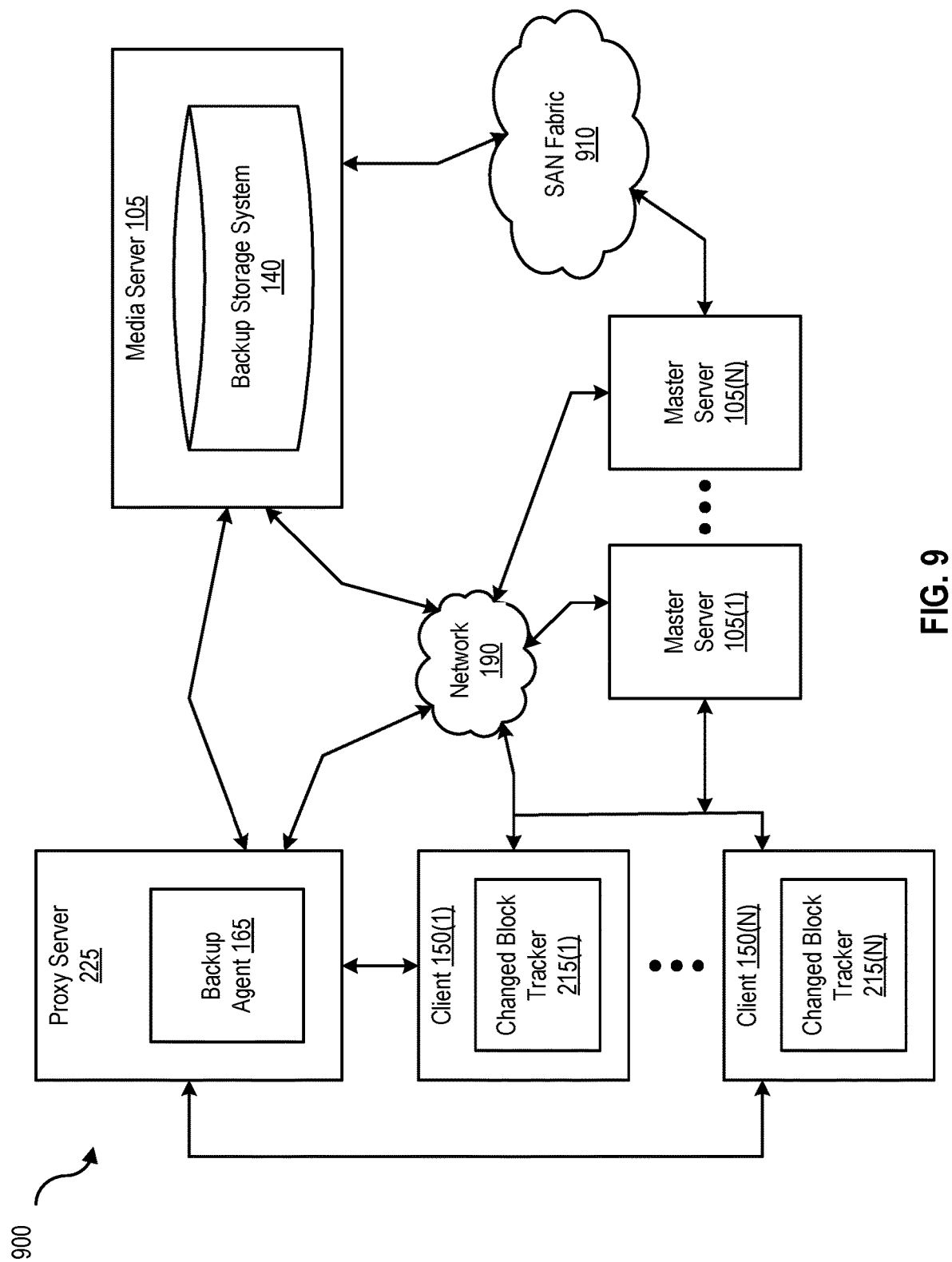
FIG. 9 is a block diagram of a network system 900, according to one embodiment of the present disclosure.

FIG. 9 is a block diagram of a networking system 900, according to one embodiment. In certain embodiments, network-attached storage (NAS) devices may be configured to communicate with master server 105, media server 115, client 150, server 205, and/or proxy server 225 using various protocols, such as Network File System (NFS), Server Message Block (SMB), or Common Internet File System (CIFS). Network 190 generally represents any type or form of computer network or architecture capable of facilitating communication between master server 105, media server 115, client 150, server 205, and/or proxy server 225.

In certain embodiments, a communication interface, such as communication interface 845 in FIG. 8, may be used to provide connectivity between master server 105, media server 115, client 150, server 205, and/or proxy server 225, and network 190. It should be noted that the embodiments described and/or illustrated herein are not limited to the Internet or any particular network-based environment. For example, network 190 can be a Storage Area Network (SAN).

In one embodiment, all or a portion of one or more of the disclosed embodiments may be encoded as a computer program and loaded onto and executed by master server 105, media server 115, client 150, server 205, and/or proxy server 225, or any combination thereof. All or a portion of one or more of the embodiments disclosed herein may also be encoded as a computer program, stored master server 105, media server 115, client 150, server 205, and/or proxy server 225, and distributed over network 190.

In some examples, all or a portion of master server 105, media server 115, client 150, server 205, and/or proxy server 225 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, client 150 may transform the behavior of media server 115 in order to cause media server 115 to improve backup and restore performance in deduplication storage environments.

It should be noted that in some situations, scenarios, and embodiments, partial segments are created because only part of a segment is changed. For example, NetBackup Accelerator's changed block tracker 215 tracks changed data in terms of changed blocks—not changed segments. Therefore, changed block tracker 215 has information only regarding changed blocks, not changed segments. Consequently, because blocks are smaller than segments, changed block tracker 215 may send (e.g., during a backup operation) only some of the blocks of what is actually a segment (thus, only a partial segment).

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A system comprising:
   one or more processors; and a memory coupled to the one or more processors, wherein
the memory stores program instructions executable by
the one or more processors to
perform a backup operation, comprising further program instructions executable by the one or more processors to
send a request for an existing metadata stream, wherein
the existing metadata stream comprises a plurality of data segment offsets associated with a plurality of data segments of a previous backup image,
the previous backup image was created prior to the backup operation, and
the plurality of data segment offsets indicate a plurality of data segment boundaries,
receive the existing metadata stream,
determine an offset for an include operation, wherein
the offset is one of a start offset or an end offset,
the include operation references one or more data segments of the plurality of data segments,
the include operation is part of a request to perform the backup operation,
at least one data segment is to be included in the backup operation as a result of the include operation, and
the at least one data segment was not in the previous backup image at the offset,
determine whether the include operation will result in a data segment of the one or more data segments becoming one or more partial data segments, wherein
the determining is based, at least in part, on the existing metadata stream and the offset, and
in response to a determination that the include operation will result in the data segment of the one or more data segments becoming the one or more partial data segments, create a modified include operation, wherein
the further program instructions executable by the one or more processors to create comprise program instructions executable by the one or more processors to
modify the include operation to include the one or more partial data segments with the at least one data segment,
determine whether the data segment is a first data segment or a last data segment of the one or more data segments,
in response to a determination that the data segment is a first data segment,
align the offset of the include operation with a data segment boundary of the plurality of data segment boundaries, such that a data segment boundary of a partial data segment of the one or more partial data segments are aligned on a first data segment boundary of the plurality of data segment boundaries, or
in response to a determination that the data segment is a first data segment,
align the offset of the include operation with the data segment boundary of the plurality of data segment boundaries, such that the data segment boundary of a partial data segment of the one or more partial data segments are aligned on a last data segment boundary of the plurality of data segment boundaries.

2. The system of claim 1, wherein
the existing metadata stream represents the previous backup image in its entirety, and
the one or more partial data segments are aligned by
aligning the offset of the include operation with a data segment boundary of the plurality of data segment boundaries.

3. The system of claim 2, wherein the further program instructions executable by the one or more processors to align comprise program instructions executable to:
move the start offset forward, if the first data segment of the one or more data segments comprises the partial data segment, or
move the end offset backward, if the last data segment of the one or more data segments comprises the partial data segment.

4. The system of claim 3, further comprising program instructions executable by the one or more processors to:
generate a modified backup stream by performing the modified include operation as part of the backup operation.

5. The system of claim 4, further comprising program instructions executable by the one or more processors to:
transmit the partial data segment instead of the first data segment to a media server, as part of the modified backup stream, if the first data segment of the one or more data segments comprises the partial data segment; and
transmit the partial data segment instead of the last data segment to a media server, as part of the modified backup stream, if the last data segment of the one or more data segments comprises the partial data segment.

6. A method comprising:
performing a backup operation, comprising
sending a request for an existing metadata stream, wherein
the existing metadata stream comprises a plurality of data segment offsets associated with a plurality of data segments of a previous backup image,
the previous backup image was created prior to the backup operation, and
the plurality of data segment offsets indicate a plurality of data segment boundaries,
receiving the existing metadata stream,
determining an offset for an include operation, wherein
the offset is one of a start offset or an end offset,
the include operation references one or more data segments of the plurality of data segments,
the include operation is part of a request to perform the backup operation,
at least one data segment is to be included in the backup operation as a result of the include operation, and
the at least one data segment was not in the previous backup image at the offset,
determining whether the include operation will result in a data segment of the one or more data segments becoming one or more partial data segments, wherein
the determining is based, at least in part, on the existing metadata stream and the offset, and
in response to a determination that the include operation will result in the data segment of the one or more data segments becoming the one or more partial data segments, creating a modified include operation, wherein the creating comprises
modifying the include operation to include the one or more partial data segments with the at least one data segment, determining whether the data segment is a first data segment or a last data segment of the one or more data segments, in response to a determination that the data segment is a first data segment, the modifying aligns the offset of the include operation with a data segment boundary of the plurality of data segment boundaries, such that a data segment boundary of a partial data segment of the one or more partial data segments are aligned on a first data segment boundary of the plurality of data segment boundaries, or in response to a determination that the data segment is a last data segment, the modifying aligns the offset of the include operation with the data segment boundary of the plurality of data segment boundaries, such that the data segment boundary of a partial data segment of the one or more partial data segments are aligned on a last data segment boundary of the plurality of data segment boundaries.

7. The method of claim 6, wherein
the existing metadata stream represents the previous backup image in its entirety, and
the one or more partial data segments are aligned by
aligning the offset of the include operation with a data segment boundary of the plurality of data segment boundaries.

8. The method of claim 7, wherein the aligning comprises:
moving the start offset forward, if the first data segment of the one or more data segments comprises the partial data segment.

9. The method of claim 8, wherein the aligning further comprises:
moving the end offset backward, if the last data segment of the one or more data segments comprises the partial data segment.

10. The method of claim 9, further comprising:
generating a modified backup stream by performing the modified include operation as part of the backup operation.

11. The method of claim 10, further comprising:
transmitting the partial data segment instead of the first data segment to a media server, as part of the modified backup stream, if the first data segment of the one or more data segments comprises the partial data segment.

12. The method of claim 10, further comprising:
transmitting the partial data segment instead of the last data segment to a media server, as part of the modified backup stream, if the last data segment of the one or more data segments comprises the partial data segment.

13. A non-transitory computer readable storage medium comprising program instructions executable to:
perform a backup operation, comprising further program instructions executable to send a request for an existing metadata stream, wherein
the existing metadata stream comprises a plurality of data segment offsets associated with a plurality of data segments of a previous backup image,
the previous backup image was created prior to the backup operation, and
the plurality of data segment offsets indicate a plurality of data segment boundaries,
receive the existing metadata stream,
determine an offset for an include operation, wherein
the offset is one of a start offset or an end offset,
the include operation references one or more data segments of the plurality of data segments,
the include operation is part of a request to perform the backup operation,
at least one data segment is to be included in the backup operation as a result of the include operation, and
the at least one data segment was not in the previous backup image at the offset,
determine whether the include operation will result in a data segment of the one or more data segments becoming one or more partial data segments, wherein
the determining is based, at least in part, on the existing metadata stream and the offset, and
in response to a determination that the include operation will result in the data segment of the one or more data segments becoming the one or more partial data segments, create a modified include operation, wherein
the further program instructions executable to create comprise program instructions executable to
modify the include operation to include the one or more partial data segments with the at least one data segment,
determine whether the data segment is a first data segment or a last data segment of the one or more data segments,
in response to a determination that the data segment is a first data segment,
align the offset of the include operation with a data segment boundary of the plurality of data segment boundaries, such that a data segment boundary of a partial data segment of the one or more partial data segments are aligned on a first data segment boundary of the plurality of data segment boundaries, or
in response to a determination that the data segment is a first data segment,
align the offset of the include operation with the data segment boundary of the plurality of data segment boundaries, such that the data segment boundary of a partial data segment of the one or more partial data segments are aligned on a last data segment boundary of the plurality of data segment boundaries.

14. The non-transitory computer readable storage medium of claim 13, wherein
the existing metadata stream represents the previous backup image in its entirety, and
the one or more partial data segments are aligned by
aligning the offset of the include operation with a data segment boundary of the plurality of data segment boundaries.

15. The non-transitory computer readable storage medium of claim 14, wherein the further program instructions executable to align comprise program instructions executable to:
move the start offset forward, if the first data segment of the one or more data segments comprises the partial data segment, or
move the end offset backward, if the last data segment of the one or more data segments comprises the partial data segment.

16. The non-transitory computer readable storage medium of claim 15, further comprising program instructions executable to:
generate a modified backup stream by performing the modified include operation as part of the backup operation.

17. The non-transitory computer readable storage medium of claim 16, further comprising program instructions executable to:
- transmit the partial data segment instead of the first data segment to a media server, as part of the modified backup stream, if the first data segment of the one or more data segments comprises the partial data segment; and
- transmit the partial data segment instead of the last data segment to a media server, as part of the modified backup stream, if the last data segment of the one or more data segments comprises the partial data segment.

* * * * *